Figure 1:
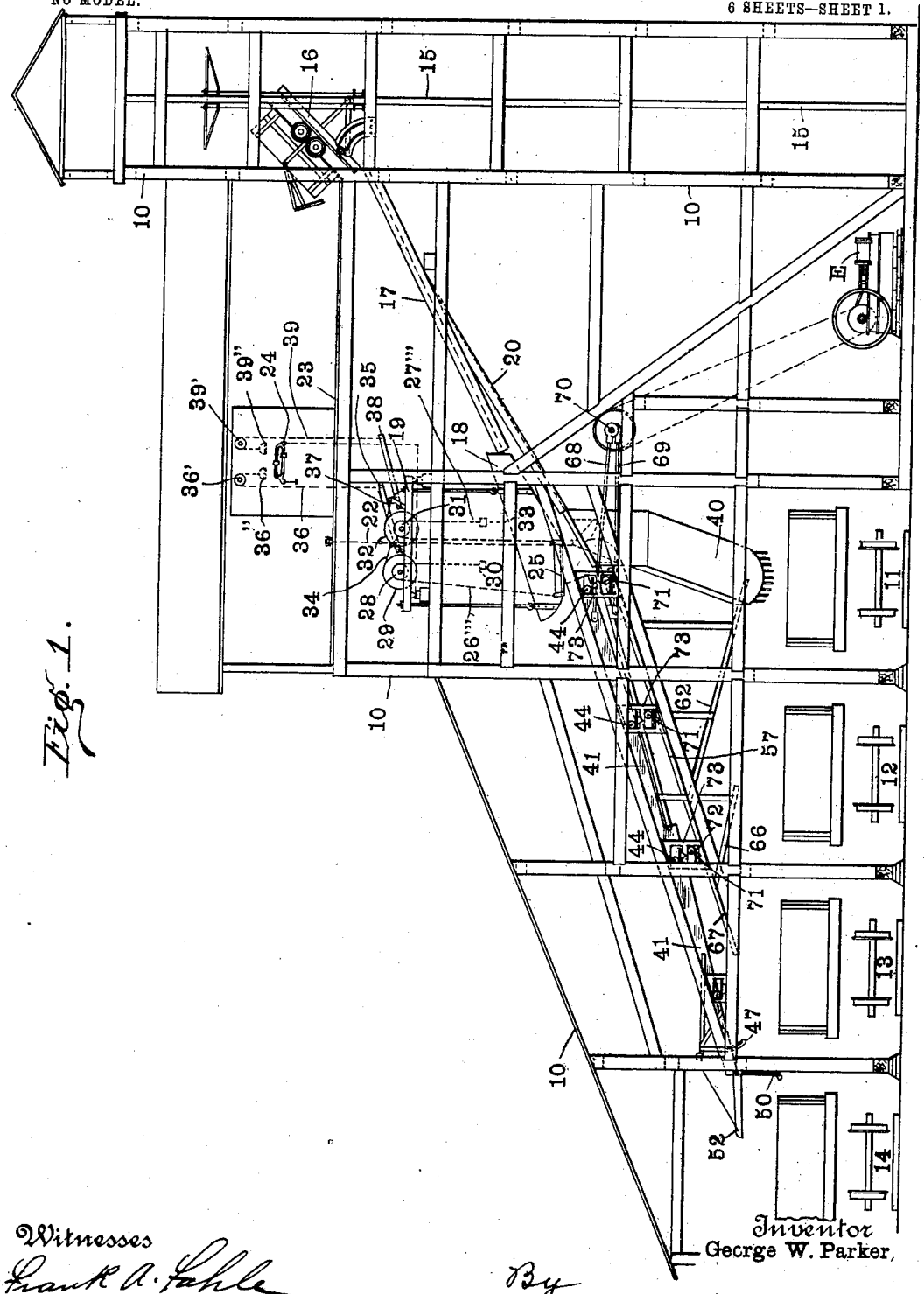

No. 739,341. PATENTED SEPT. 22, 1903.
G. W. PARKER.
MINE TIPPLE.
APPLICATION FILED JUNE 20, 1903.
NO MODEL. 6 SHEETS—SHEET 2.

Witnesses
Adelaide Kearns
J. A. Walsh

Inventor
George W. Parker
By Bradford & Hood,
Attorneys

No. 739,341. PATENTED SEPT. 22, 1903.
G. W. PARKER.
MINE TIPPLE.
APPLICATION FILED JUNE 20, 1903.

NO MODEL. 6 SHEETS—SHEET 3.

Witnesses
Frank A Fahle
J. A. Walsh.

Inventor
George W. Parker
By Bradford & Hood,
Attorneys

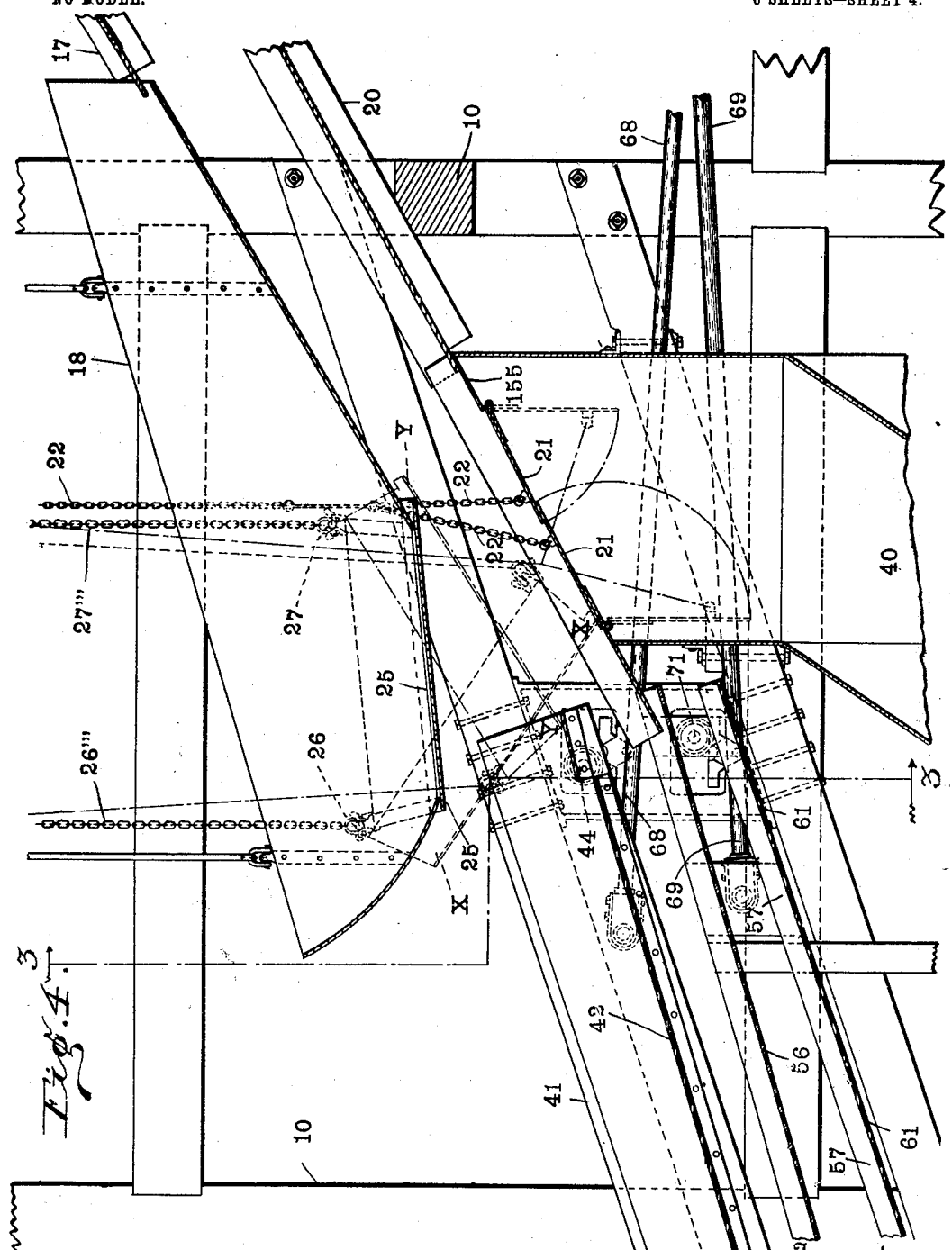

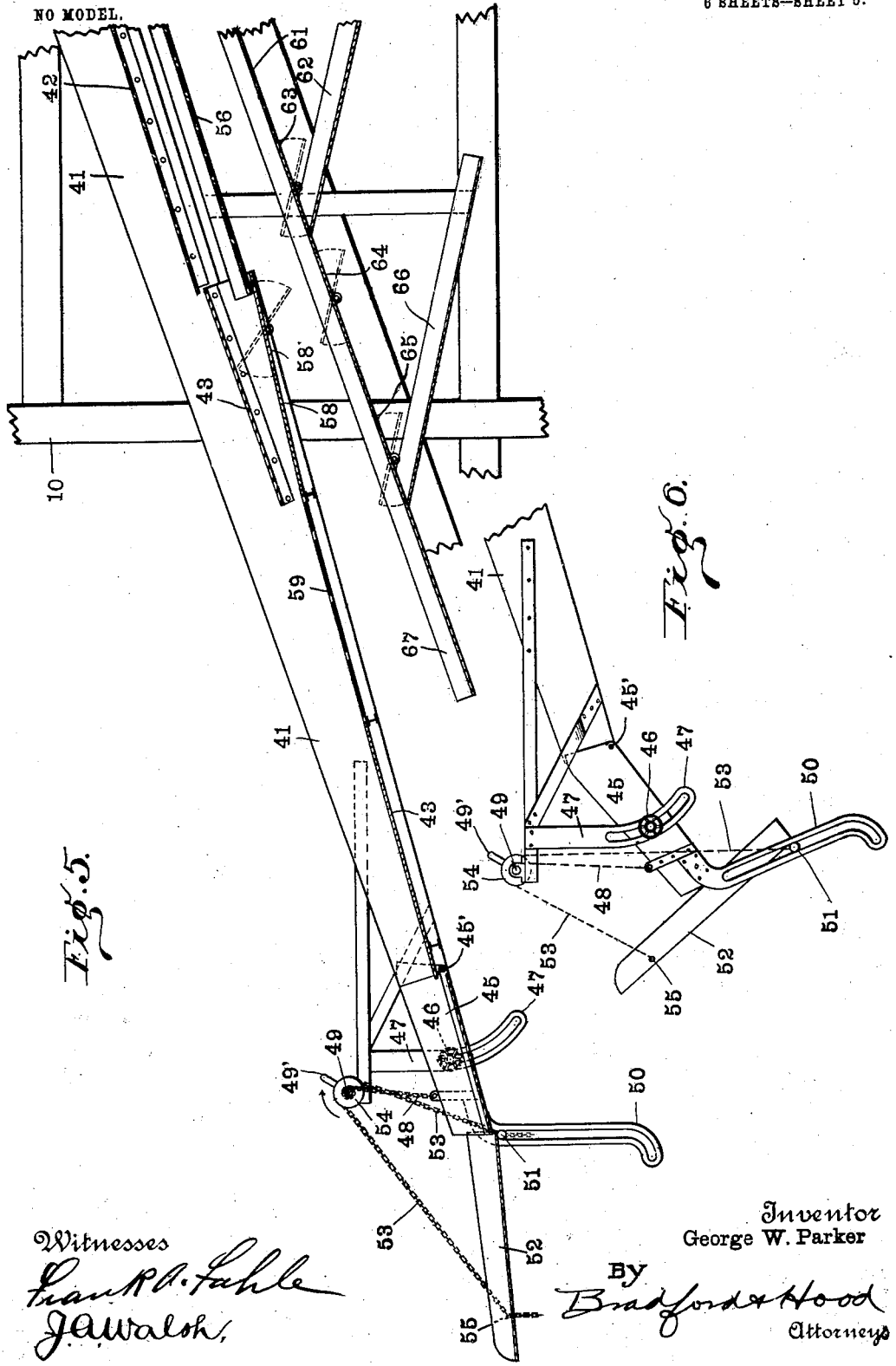

No. 739,341. PATENTED SEPT. 22, 1903.
G. W. PARKER.
MINE TIPPLE.
APPLICATION FILED JUNE 20, 1903.
NO MODEL. 6 SHEETS—SHEET 6.
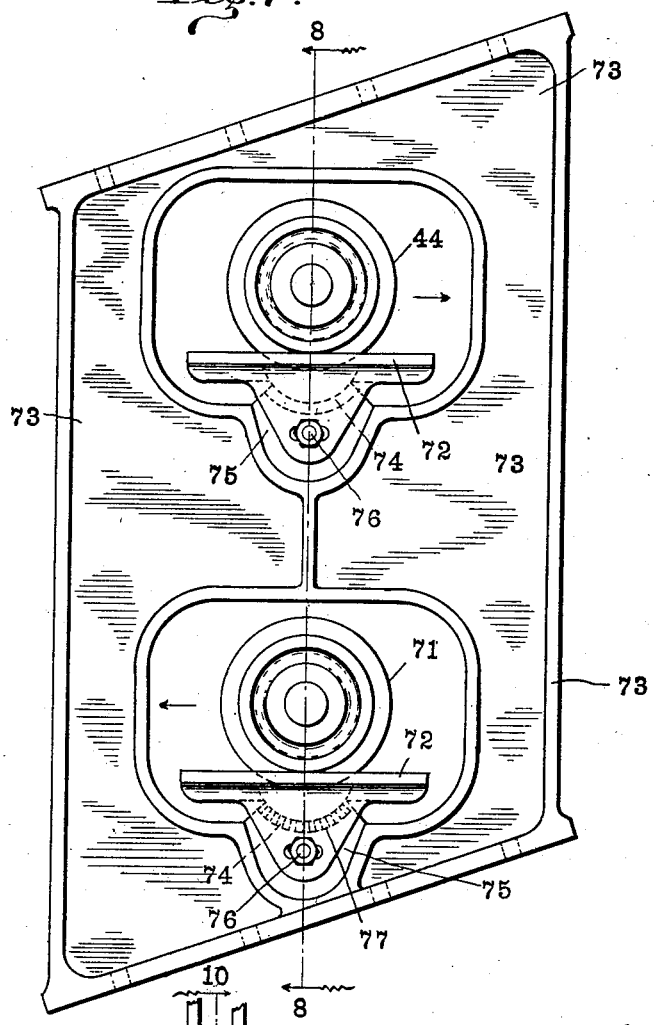
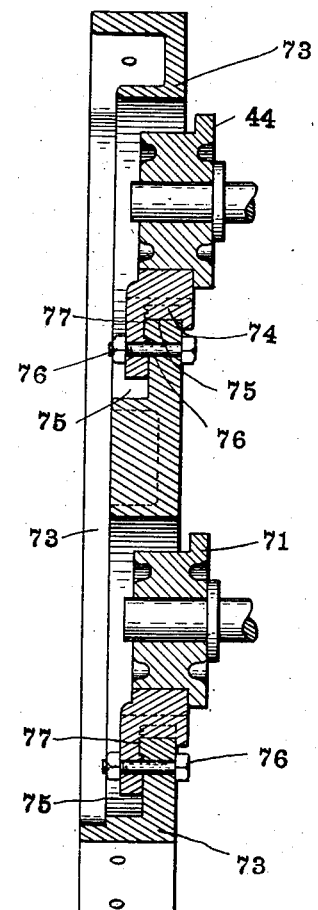
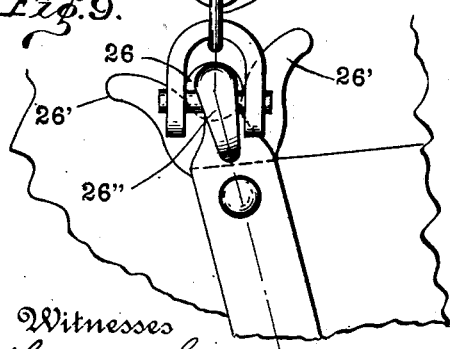
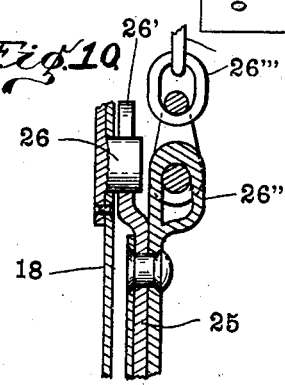
Witnesses
Frank A. Fahle
J. A. Walsh
Inventor
George W. Parker
By Bradford Hood
Attorneys No. 739,341. Patented September 22, 1903.

UNITED STATES PATENT OFFICE.

GEORGE W. PARKER, OF TERRE HAUTE, INDIANA.

MINE-TIPPLE.

SPECIFICATION forming part of Letters Patent No. 739,341, dated September 22, 1903.

Application filed June 20, 1903. Serial No. 162,328. (No model.)

*To all whom it may concern:*

Be it known that I, GEORGE W. PARKER, a citizen of the United States, residing at Terre Haute, in the county of Vigo and State of Indiana, have invented certain new and useful Improvements in Mine-Tipples, of which the following is a specification.

In the operation of coal-mines it has become necessary to divide the product into a greater number of gradations than was formerly the custom. It has also become the custom in some localities (either customarily or intermittently) to make wage agreements providing for payment to the miners on one basis, while the coal is sold upon another basis. In other cases or at other times it is necessary at the same mine to make payment upon the same basis that the coal is loaded and sold, and from time to time for certain periods it becomes necessary to alternatively grade the product to correspond with either one or the other of the two methods of payment for mining, while at all times providing for the comparatively numerous gradings which the modern market demands—that is, in many cases wage agreements contemplate payment to the miners on the basis of "mine-run" coal when the output is being loaded in that grade and payment on the basis of "screened" coal when the output is being loaded in that grade, while in other cases the reverse is the fact. In the case of payment on the screened-coal basis all coal which passes through the prescribed screen (usually an inch-and-a-quarter screen) is separated before the coal passes to the weigher, and the miner is paid only for the coal which passes over the screen, while in case of payment on the mine-run basis all the coal passes to the weigher, and the gradations, if any, are made after the weighing takes place.

One of the objects of my invention is, therefore, to provide a convenient means by which the coal may be weighed in accordance with the wage agreement, yet by which the coal, irrespective of the method of payment, may be readily divided into the several gradations or may be conveniently reassembled into mine-run coal.

A further object of my invention is to provide means by which mine-run coal may be loaded either under the mine-run or screened-coal scale of wage without the necessity of operating the screens by which the finer subdivisions of the coal are secured.

A further object of my invention is to provide means which will practically prevent vibration strains of the tipple-building occasioned by the operation of the reciprocating screens and to provide means by which the path of movement of the screens may be varied in accordance with the particular condition of coal at any time.

A further object of my invention is to provide an improved form of discharging-chutes for lump-coal and to provide such improvements relating to construction as are hereinafter pointed out.

Figure 2:
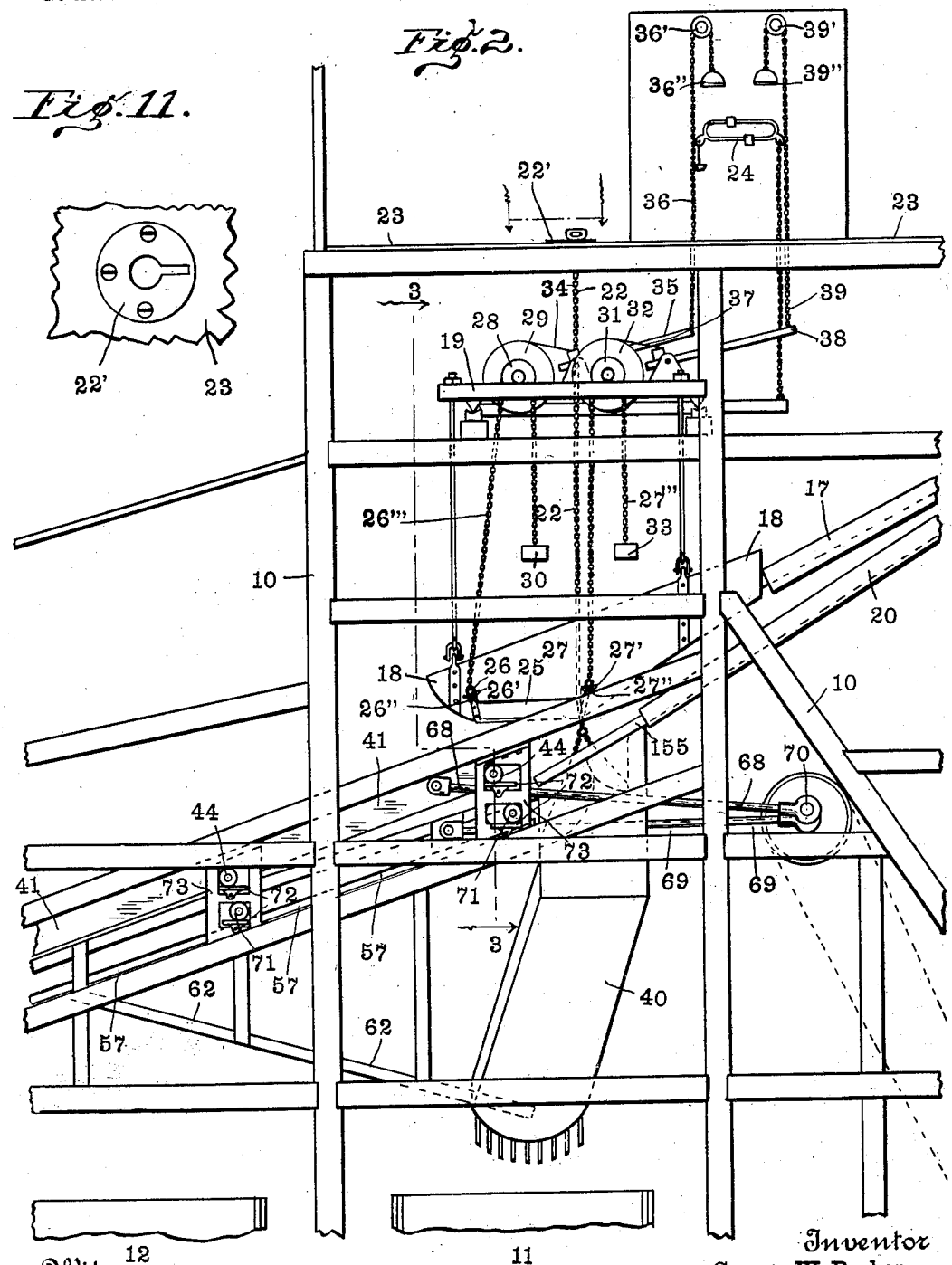
Figure 3:
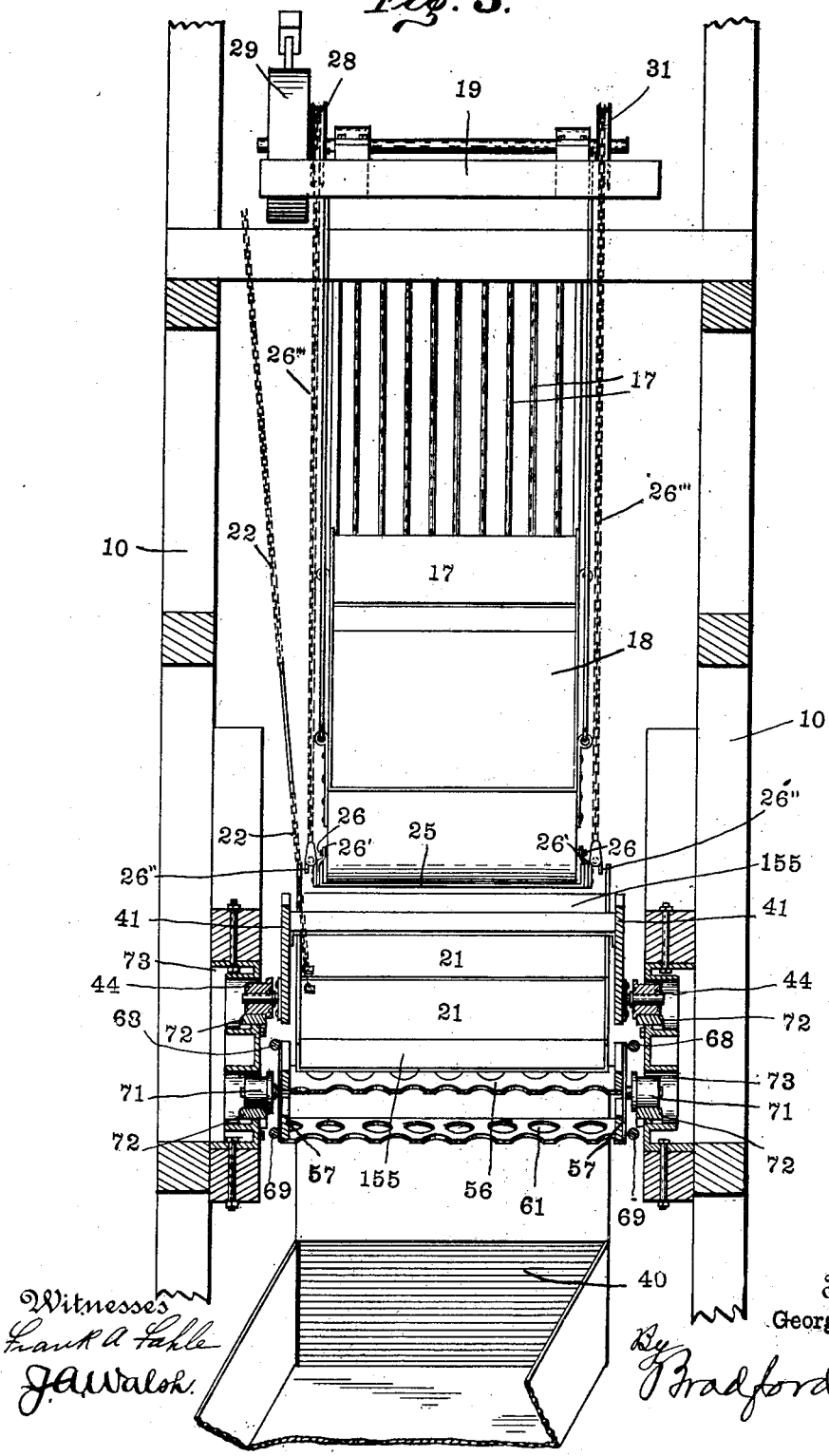

In the drawings, Figure 1 is a side elevation in skeleton of a tipple-building provided with my improvements; Fig. 2, a view similar to a portion of Fig. 1, but on an enlarged scale; Fig. 3, a transverse vertical sectional view as seen when looking in the direction indicated by the arrows from the dotted lines 3 3 in Figs. 2 and 4. Fig. 4 is a central vertical section of my improved weigher-hopper and adjacent parts, by means of which the coal may be conveniently handled for mine-run or screen classification. Fig. 5 is a central vertical section of the lower ends of the two separating-screens and the lump-coal-discharging spout. Fig. 6 is a side elevation of the discharging-spout in retracted position. Fig. 7 is a side elevation of my improved track-bracket for supporting the vibratory screen. Fig. 8 is a vertical section thereof on the dotted line 8 8 of Fig. 7. Fig. 9 is a detail of one of the supports and connections for one end of my hopper-bottom. Fig. 10 is a section on line 10 10 of Fig. 9, and Fig. 11 a detail plan view as seen from the dotted line 11 above Fig. 2.

In the drawings, 10 indicates a suitable tipple-building, which covers a multiplicity of tracks. Four tracks 11, 12, 13, and 14 are shown; but a greater or less number may be employed. The tipple-building includes the usual elevator-shaft 15, in which is mounted the usual pair of elevators 16, only one of said elevators being shown. The elevators discharge into a suitable chute, commonly the usual bar-screen 17, the material which does not pass through said screen being delivered to a weighing-hopper 18, which is supported from the scale-platform 19, while the material which passes through said screen drops upon a plate 20, which discharges upon a pair of doors 21 21, which will be more fully described hereinafter and which are supported by a chain 22, which passes upward to the floor 23 of the tipple-building, where it engages with a suitable catch 22', the engagement and release being effected manually by the operator as required. Located adjacent to this platform is the usual weigh-beam 24, which is connected to the scale-platform 19 in a usual manner.

The weighing-hopper 18 is provided with an opening in its bottom, and this opening is covered by a swinging bottom 25, which is capable of being swung upon the supports at either one of its ends, so as to thus discharge the contents of the hopper in either of two opposite directions, and therein lies one of the essential features of my invention. It will be readily understood that many means may be provided to permit such movement of the hopper-bottom, although in the drawings I have shown but one of these ways. Projecting from each side of hopper 18 are two pins 26 and 27, which are located at opposite ends of the opening in the hopper, said pins being in line, respectively, with similar pins upon the opposite side of the hopper. The hopper-bottom 25 is provided at its ends with two pairs of forks 26' and 27', the forks 26' being adapted to receive or be brought into engagement with pins 26, while the forks 27' may be similarly brought into engagement with pins 27. The opposite ends of the hopper-bottom are also provided with eyes 26'' and 27'', to which are connected two pairs of chains 26''' and 27'''. The chains 26''' are led upward to and over a roller 28, which is carried by a friction-drum 29, revolubly mounted upon the scale-platform 19, and the free end of said chain is provided with a counterweight 30, which is sufficient to hold the forks on the corresponding end of the hopper-bottom up into engagement with pins 26 when there is no coal in the hopper. Similarly the chains 27''' are carried over a wheel 31, connected to a friction-drum 32, and said chains are provided with counterweights 33. Drum 29 is provided with a friction-band 34, controlled by a lever 35, which lever is provided with an operating-chain 36, carried up to convenient position on the weighing-platform. Lever 35 is of sufficient weight to normally prevent rotation of drum 29 even when hopper 18 is filled with coal, and similarly drum 32 is controlled by a band 37, lever 38, and chain 39. The chains 36 and 39 are shown as passing over sheaves 36' and 39' and as carrying on their depending ends counterweights 36'' and 39''.

The opening in the bottom of hopper 18 is so located that when the hopper-bottom is allowed to swing about pins 26 as an axis, so as to move to the position shown at X X in dotted lines in Fig. 4, said bottom will discharge through the opening normally closed by doors 21 21, and these doors lead to a mine-run chute 40, which leads to a point above track 11. Leading from a point just beyond the mine-run chute where the hopper-bottom will discharge thereto when swung about the pins 27 to the position shown by dotted lines at Y Y is the upper or first screen-frame 41, which, as usual, is provided with a series of screens 42 and interposed plates 43. This screen-frame instead of being supported by swinging links, as heretofore, is mounted upon rollers 44, which rollers are arranged in opposite pairs at different points in the length of frame 41.

Pivoted to the lower end of the screen-frame 41 is an adjustable chute 45, and extending beyond this is an extension chute or apron 52, and by means of these two parts 45 and 52 the delivery of the "lump" or large-sized coal at the extreme lower end of the apparatus is controlled. The chute part 45 is connected to the screen-frame 41 by a pivot 45'. It is adapted to be secured in adjusted position by a clamping-screw 46, which passes through an arc-shaped slot formed in the supporting-arm 47. To a point at or near its outer end a chain 48 is connected, which is wound about shaft 49, which shaft is adapted to be actuated by a crank 49'. By loosening the screws 46 and winding the shaft 49 the adjustment of this chute 45 is effected.

Secured to the outer end of the chute 45 at each side thereof is a depending slotted arm 50, in the slot of each of which is supported a pin 51, carried by the rear end of the extension chute or apron 52. Secured to each end of pin 51 is a chain 53, which passes over a loosely-mounted sheave 54, carried by a shaft 49, and thence downwardly to a point at or near the outer end of the extension chute or apron 52, where it is secured, (at 55,) the arrangement being such that when the parts are in the position shown in Fig. 5 the weight of the supplemental chute is sufficient to maintain the pin 51 at the upper ends of the slots or arms 50. Chain 53 is made of surplus length, as shown in Fig. 5, in order that the angle of the supplemental chute may be easily adjusted. By means of this construction the supplemental chute 52 may be easily retracted from discharging position even though it has been projected into the door of a box-car by the operative, said chute being so nearly balanced that the position thereof is easily manipulated by hand from extended position, as shown in Fig. 5, to retracted position, one such retracted position being illustrated in Fig. 6.

The doors 21 form part of the bottom of a chute 155, which when the doors 21 are closed bridges over the mine-run chute 40 and forms a continuation of floor 20, so that material passing therefrom may be discharged upon the upper screen 56 above the lower screen-frame 57. The screen 56 has its lower end projected to lie above a floor 58, (see Fig. 5,) forming part of the upper screen-shoe and leading to the coarsest screen 59 thereof, and at the point of discharge floor 58 consists of a door 58', which may be swung, as indicated by dotted lines in Fig. 5. The second screen-frame carries beneath the screen 56 a screen 61, which screen lies above the chute 62, which is carried by the lower screen-frame and extends back toward and above the track 11. Screen 61 ends in a door 63, which is capable of being swung so as to discharge material to chute 62. Beyond door 63 the lower screen-frame carries a plate, which consists in part of doors 64 and 65, both of which are capable of being turned to discharge upon a rearwardly-inclined chute 66, which discharges over track 12. The second screen-chute has a continuation 67, which extends beyond door 65 to above track 13.

The screen-frames 41 and 57 are simultaneously reciprocated in opposite directions by means of pitmen 68 and 69, respectively, which are connected to an operating-shaft 70, driven in any suitable manner, as by engine E. The screens are generally reciprocated continuously during the working day, and the vibration of the building caused thereby has heretofore been very great. By my present construction, however, I find by actual practice that the vibration of the building due from this cause is practically eliminated, and I produce this result in the following manner: The second screen-frame is supported by rollers 71, which are similar to the rollers 44, and I arrange the rollers of the two screen-frames in opposite pairs, as shown in Fig. 3, so that when the two screen-frames are in medial positions the several sets of rollers will be arranged in vertical pairs, and each of the rollers is supported upon a short section of track 72, the two sections of track being supported in a single housing 73, which may be rigidly bolted between the frame-timbers of the building. Each track 72 is provided with an arc-shaped lug 74, (see dotted lines, Fig. 7,) which rests in a similarly-shaped socket 75, formed in housing 73, and these tracks may be adjusted angularly, so that they may be arranged either horizontally or at a slight angle to the horizontal in either direction from the vertical and clamped in position by means of a suitable clamping-bolt 76, angular displacement being prevented by means of interacting corrugations 77 in the usual well-known manner. When one of the tracks 72 is adjusted to one side of the horizontal, the other track shall be similarly adjusted, and such adjustment is found very convenient in order to permit the screens to properly act upon coal in different conditions.

In operation suppose that the company is paying "screen" prices, but desires to load cars with mine-run coal, the coal passes down the bar-screen 17 and the usual amount of fine stuff passes to floor 20 and from thence through the opening normally closed by doors 21 into the mine-run chute 40. The coarser stuff (for which the miner is paid) passes into hopper 18, and after it has been weighed the operator upon the platform 23 lifts lever 38 and releases drum 32, whereupon the weight of the coal in the hopper is sufficient to swing the hopper-bottom down to the position shown by dotted lines at X X in Fig. 2 and discharge the coal from the hopper into the mine-run chute. Under these circumstances it is not necessary to run the screen-frames 41 and 57. If the miner is being paid mine-run prices, the bar-screen 17 is covered with plates in the usual well-known manner and all the coal passes to the hopper 18 and is weighed and then dumped through doors 21 into mine-run chute 40. If, on the other hand, the miner is being paid screen prices and screened coal is to be sold, the screen-frames 41 and 57 are put in operation, and when coal has been weighed in the hopper 18 the operator releases lever 37, and thus releases drum 29, so that the hopper-bottom swings about the pins 27 to the position shown by dotted lines at Y Y in Fig. 2 and discharges upon the upper screen 42, while the material for which the miner is not paid (which has passed through the bar-screen 17) slides down the floor 20 and over doors 21 21 (which have been previously closed) onto a screen 56. The coal passes through the several screens, and by regulating doors 58', 63, 64, and 65 the screened coal may be directed through the several chutes into the cars on the tracks 11, 12, 13, and 14, the coal being assorted into as many or as few of the graduations provided for as is desired.

I claim as my invention—

1. A hopper for mine-tipples provided with a swinging bottom, and means for swinging said bottom from either of its ends.

2. In a mine-tipple, the combination, with a retaining-hopper and means for discharging material into said hopper, of separating-screens, a mine-run chute, a bottom for said hopper, and means for swinging said bottom to discharge either upon the screens or into the mine-run chute.

3. In a mine-tipple, the combination, with a retaining weighing-hopper and means for discharging material into said hopper, of separating-screens, a mine-run chute, and means for discharging material from said hopper either to the screens or to the mine-run chute.

4. In a mine-tipple, the combination, with a hopper, of a screen over which material may be discharged into said hopper, a mine-run chute, a chute leading from beneath said screen to said mine-run chute, a door capable of bridging said mine-run chute at the end of said screen-chute so as to discharge upon the reciprocating screens, said reciprocating screens, and means for discharging material from said hopper either upon said reciprocating screens or into the mine-run chute.

5. In a mine-tipple, a receiving-hopper having an open bottom, two pairs of pins arranged at opposite sides of said hopper at opposite ends of said open bottom, a hopper-bottom provided at its opposite ends with forks capable of engaging said pins, means for independently supporting the opposite ends of said hopper, and means for releasing either end, whereby said hopper-bottom may be caused to swing upon either of its ends and is enabled to discharge the material from the hopper in opposite directions.

6. In a mine-tipple, a receiving-hopper having an open bottom, two pairs of pins arranged at opposite ends of said open bottom, a hopper-bottom provided at its opposite ends with forks capable of engaging said pins, a pair of supporting-drums, flexible supports attached to each end of said hopper-bottom, the supports of one end passing over one drum and the supports of the other end passing over the other drum, and means for controlling the movement of said drums, whereby said hopper-bottom may be caused to swing upon either of its ends and thus enabled to discharge the material from the hopper in opposite directions.

7. In a mine-tipple, the combination of a mine-run chute, a preceding chute, a screen over said chute, a succeeding chute, means for discharging from said screen to the succeeding chute or to the mine-run chute, and pivoted doors forming a continuation of said preceding chute and extending across over said mine-run chute, said pivoted doors being adapted when closed to direct the flow of coal across the mine-run chute to the succeeding chute, and when opened to permit the coal to flow into said mine-run chute without reaching said succeeding chute.

In witness whereof I have hereunto set my hand and seal, at Indianapolis, Indiana, this 15th day of June, A. D. 1903.

GEORGE W. PARKER. [L. S.]

Witnesses:
CHESTER BRADFORD,
JAMES A. WALSH.